Oct. 27, 1931.   D. E. ATKINSON   1,829,467
PLOW HANDLE
Filed May 28, 1930
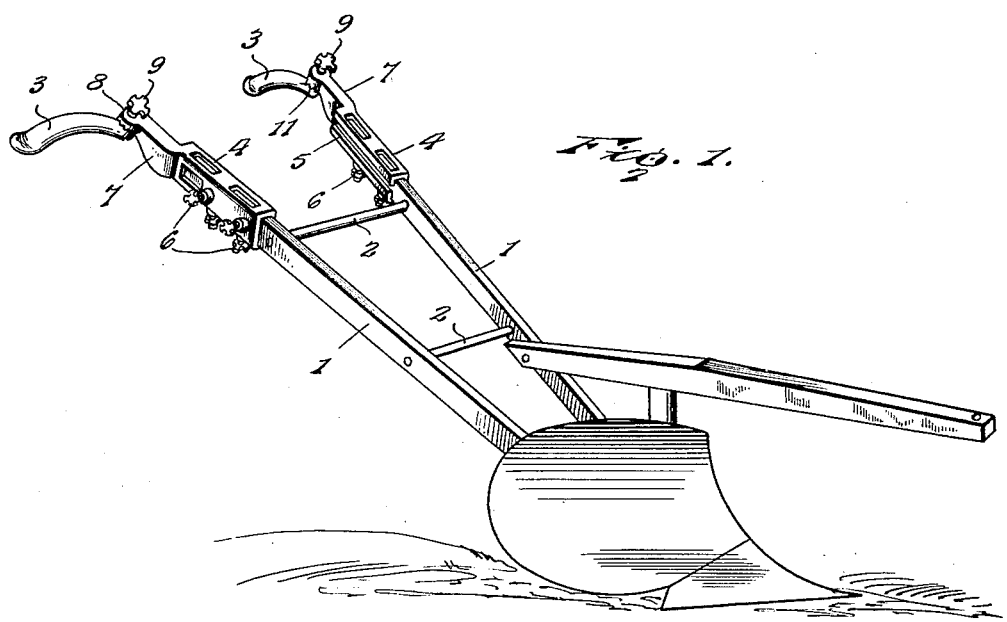
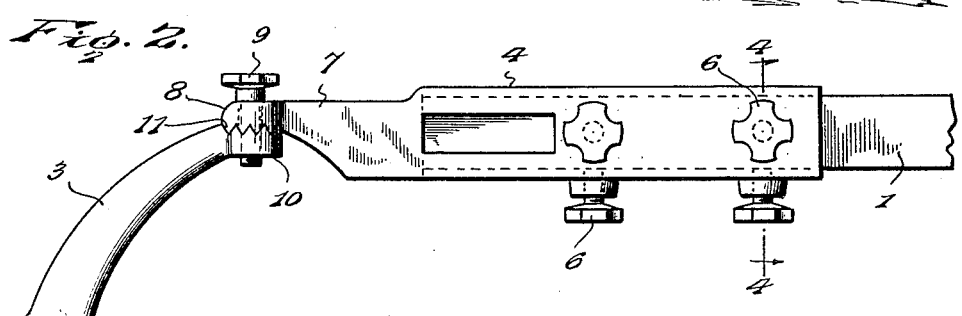
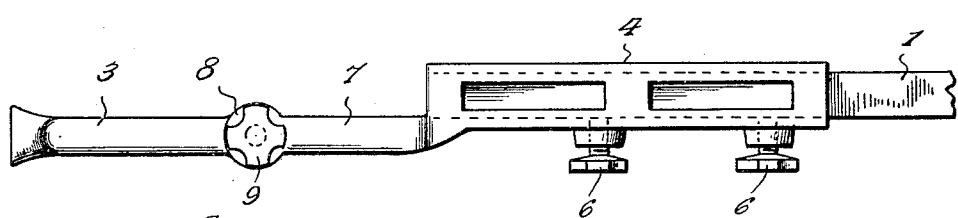
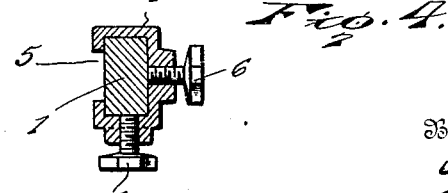
Inventor
D. E. Atkinson.
By Lacey & Lacey,
Attorneys Patented Oct. 27, 1931

1,829,467

UNITED STATES PATENT OFFICE

DANIEL E. ATKINSON, OF TALLAHASSEE, FLORIDA

PLOW HANDLE

Application filed May 28, 1930. Serial No. 456,691.

The invention provides a handle for agricultural implements of the plow, cultivator and harrow type which may be readily adjusted to the convenience of the operator and made secure in the adjusted position against possible displacement.

The invention has as a primary object the provision of a handle adapted for general use on different sizes and kinds of implements and which may be adjusted to suit the needs and comfort of the user.

The invention relates to a handle of the character aforesaid, of metal, and comprising the usual curved grip and attaching end for reception of the handle bar upon which it is slipped and provided with fastening means to secure the handle firmly in the required adjusted position.

While the drawings illustrate a preferred embodiment of the invention, it is to be understood that in adapting the means to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and drawings hereto attached, in which:

Figure 1 is a perspective view of a conventional plow provided with adjustable handles embodying the invention.

Figure 2 is a side view of the handle, showing the parts on a larger scale.

Figure 3 is a top plan view of the parts illustrated in Figure 2.

Figure 4 is a detail sectional view on the line 4—4 of Figure 2.

Corresponding and like parts are referred to in the following description and designated in the several views of the drawings by like reference characters.

The plow illustrated is typical of the class of implements for which the invention is designed. The numeral 1 designates bars forming a part of the implement and to which the improved handles are attached. The handle bars 1 are braced by cross pieces 2 in the accustomed manner.

The handles include grips 3 and members 4, the latter being elongated and hollow to slip upon the bars 1. The inner sides of the members 4 are longitudinally slotted, as indicated at 5, to provide clearance for the upper cross piece 2 when adjusting the handles to the bars 1. Clamp screws 6 are threaded into adjacent sides of the members 4 and provide means for securing the handles to the bars 1 in the required adjusted position. A shank 7 projects from the upper outer end of each of the members 4 and terminates in a head 8 in which is formed an aperture to receive a clamp screw 9. Each of the hand grips 3 is curved and terminates in a head 10 to match the head 8 and in which is formed a threaded opening to receive the clamp screw 9. The adjacent faces of the heads 8 and 10 are toothed, as indicated at 11, to prevent possible displacement of the grips after they have been adjusted and secured by means of the clamp screws 9. The grips 3 and handle members 4 are constructed of metal and usually consist of castings. When the handles have been adjusted to the bars 1 they are made secure by means of the clamp screws 6 and should it be required to adjust the grips 3, the clamp screws 9 are backed a distance to admit disengagement of the teeth 11. After the grips 3 have been adjusted they are made secure by re-tightening the clamp screws 9, as will be readily appreciated. The handles are adapted for implements of the type provided with handle bars and admit of lengthening or shortening the handle bars to suit tall and short persons. The grips 3 may likewise be adjusted to the convenience of the operator.

What is claimed is:

A handle for agricultural implements of the character specified, the same comprising an elongated hollow body longitudinally slotted along its inner side and having its outer side provided with threaded openings, clamp screws for securing the body to the handle bar of the implement in the required and adjusted position engaged through the threaded openings, a shank extending rearwardly from the body and terminating in a head at its rear end having its under face formed with teeth, a grip terminating at its front end in a head disposed beneath the head of the shank and having its upper face formed with teeth adapted to engage with the teeth of the head of the shank, and a clamp bolt passing through the mating heads of the shank and grip to adjustably connect the grip to the shank of said body and to permit the grip to be adjusted transversely thereof in a horizontal plane.

In testimony whereof I affix my signature.

DANIEL E. ATKINSON. [L. S.]